Oct. 26, 1937.    C. D. MASON    2,097,161
AMUSEMENT DEVICE
Filed Nov. 2, 1935
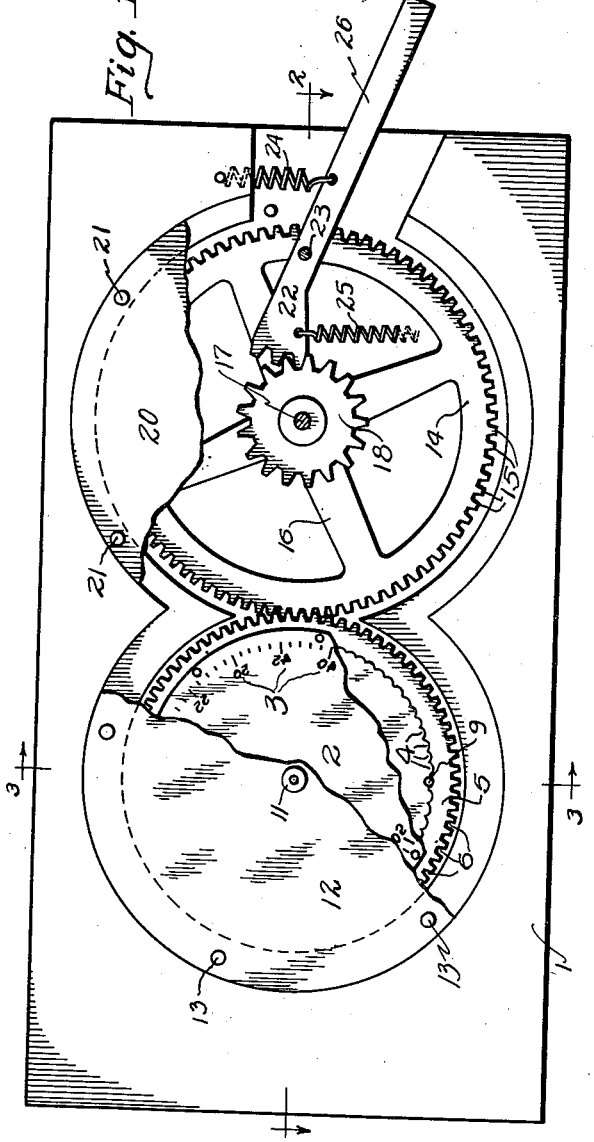
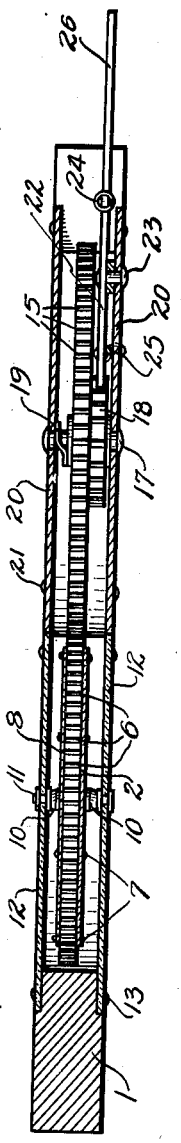
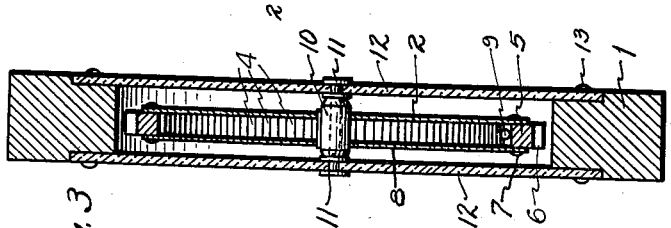
Inventor
Charles D. Mason
by Rummler Rummler & Woodworth
Attys.

Patented Oct. 26, 1937

2,097,161

UNITED STATES PATENT OFFICE 2,097,161

AMUSEMENT DEVICE

Charles D. Mason, Chicago, Ill.

Application November 2, 1935, Serial No. 47,923

8 Claims. (Cl. 88—26)

This invention relates to an improved amusement device adapted to be used with stereopticons for projection upon a screen.

The main object of my invention is to provide a chance device in which the position at which a bouncing ball comes to rest is the index; further to provide a substantial construction in which a rotating ball container can be revolved at the desired speed; to provide apparatus of this kind comprising an opaque ball free to move between transparent sides; and having pockets in the rotatable container, one of which will seat the ball when at rest; to provide a rotating ball container of this type with gear teeth meshing with gear teeth on a drive wheel; to provide improved operating means comprising a multiple toothed pawl, which is capable of starting or stopping the drive wheel and is normally held out of engagement with the drive wheel; and to provide a substantial construction in which the position of the indicating ball can be accurately determined.

An illustrative embodiment of my invention is shown in the accompanying drawing, in which Figure 1 is a plan view partly in section of a stereopticon slide carrier in which is mounted the amusement device.

Fig. 2 is a section on line 2—2 of Fig. 1.

Fig. 3 is a section on line 3—3 of Fig. 1.

In the form shown, my bouncing ball amusement device is mounted in a frame 1, which is of standard stereopticon slide carrier size, and comprises a transparent circular plate or disc 2, shown partly in section in Fig. 1, which is marked by opaque graduations or divisions 3, which are arranged to indicate on the transparent field the scalloped pockets 4 cut in the separator or spacing ring 5 on its inner periphery the spacer ring is also provided with external gear teeth 6 on its outer periphery.

The transparent circular plate 2 is fastened to the separator 5 by rivets 7, which pass through the separator and a second transparent circular plate 8 which does not have division marks. Between the plates 2 and 8 is placed a steel ball 9 having a diameter less than the distance between the plates. In the center of the plates 2 and 8 is placed a hub 10, fitted to rotate in bearings 11 located in the transparent cover plates 12—12, which are fastened to a circular opening in the carrier frame by fasteners 13.

A gear wheel 14 having teeth 15 is arranged to mesh with the gear teeth 6 on the separator 5. The gear 14 is provided with spokes 16 and a hub shaft 17 to which is fastened a cog drive gear or sprocket 18. The shaft 17 coacts with and is journaled in the bearings 19 of the metal plates 20—20 which form covers for the circular opening through the carrier and enclose the gear 14. The plates 20—20 are fastened to the frame by any suitable means such as nails 21.

A multiple toothed pawl 22 is mounted on the stud bearing 23 which is attached to the adjacent metal plate 20. The pawl is normally held out of engagement with the gear 18 by the springs 24 and 25. The pawl arm 26 extends beyond the carrier frame to permit operation of the pawl.

In operation the section of the slide carrier which contains the rotating ball container with transparent sides is placed to the optical center of the lantern for even illumination. The rotating ball container is the object which is projected to form an image upon the screen by means of the usual lens. In my device the bouncing ball is held by gravity at or near the lowest central pocket in the rotatable ball container.

When projected upon the screen the opaque ball appears to be suspended in the top pocket. When the pawl arm extending beyond the limit of the usual slide carrier is moved, the drive wheel is caused to rotate and in turn rotates the driven rotatable ball container; with the result as seen viewing the image upon the screen the ball is carried for a distance in the pocket in which it is seated, soon falling out as it turns and instead of dropping downward appears to go upward. As the velocity increases the ball rapidly bounces about in its container. The rotatable container may be allowed to normally come to rest with the ball finally resting in one of the pockets, the pockets being identified by the numerals which appear in the projected picture adjacent the respective pockets. The rotating container may be rapidly stopped by moving the pawl arm, so that the teeth engage the toothed wheel on the drive gear.

Although but one specific embodiment of this invention is herein shown and described, it will be understood that certain details of the construction shown may be altered or omitted without departing from the spirit of this invention as defined by the following claims:

I claim:

1. In a device of the class described, a frame member, a separator ring mounted therein and provided with scalloped pockets on its inner periphery, a pair of transparent discs secured one on each side of said ring, one of said discs having graduations thereon adjacent its periphery, an opaque ball disposed between said discs and freely movable therebetween, a pair of transparent plates secured one on each side of said frame, means for pivotally securing said discs to said plates, and means arranged to rotate said ring.

2. In a device of the class described, a frame member, a separator ring mounted therein and provided with scalloped pockets on its inner periphery, a pair of transparent discs secured one on each side of said ring, one of said discs having graduations thereon adjacent its periphery, an opaque ball disposed between said discs and freely movable therebetween, a pair of transparent plates secured one on each side of said frame, a hub extending transversely through and secured to said discs, a bearing secured to each of said plates, said hub being journaled in said bearings, and means to rotate said ring.

3. In a device of the class described, a frame member, a separator ring mounted therein and provided with scalloped pockets on its inner periphery, a pair of transparent discs secured one on each side of said ring, one of said discs having graduations thereon adjacent its periphery, an opaque ball disposed between said discs and freely movable therebetween, a pair of transparent plates secured one on each side of said frame, means for pivotally securing said disks to said plates, and means on said frame member arranged to rotate said ring.

4. In a device of the class described, a frame member, a separator ring mounted therein and provided with scalloped pockets on its inner periphery and external gear teeth on its outer periphery, a pair of transparent discs secured one on each side of said ring, one of said discs having graduations thereon adjacent its periphery, an opaque ball disposed between said discs and freely movable therebetween, a pair of transparent plates secured one on each side of said frame, a hub extending through and secured to said discs, a bearing secured to each of said plates, said hub being journaled in said bearings, and means coacting with said gear teeth to rotate said ring.

5. In a device of the class described, a frame member, a separator ring mounted therein and provided with scalloped pockets on its inner periphery and external gear teeth on its outer periphery, a pair of transparent discs secured one on each side of said ring, one of said discs having graduations thereon adjacent its periphery, an opaque ball disposed between said discs and freely movable therebetween, a pair of transparent plates secured one on each side of said frame, a hub extending transversely through and secured to said discs, a bearing secured to each of said plates, said hub being journaled in said bearings, a drive gear meshing with the gear teeth on said ring, means to support said drive gear and means for operating said drive gear to rotate said ring.

6. In a device of the class described, a frame member, a separator ring mounted therein and provided with scalloped pockets on its inner periphery and external gear teeth on its outer periphery, a pair of transparent discs secured one on each side of said ring, one of said discs having graduations thereon adjacent its periphery, an opaque ball disposed between said discs and freely movable therebetween, a pair of transparent plates secured one on each side of said frame, a hub extending transversely through and secured to said discs, a bearing secured to each of said plates, said hub being journaled in said bearings, a drive gear meshing with the gear teeth on said ring, an axial shaft provided on said drive gear and journaled in said frame, and means for driving said drive gear.

7. In a device of the class described, a frame member, a separator ring mounted therein and provided with scalloped pockets on its inner periphery and external gear teeth on its outer periphery, a pair of transparent discs secured one on each side of said ring, one of said discs having graduations thereon adjacent its periphery, an opaque ball disposed between said discs and freely movable therebetween, a pair of transparent plates secured one on each side of said frame, a hub extending transversely through and secured to said discs, a bearing secured to each of said plates, said hub being journaled in said bearings, a drive gear meshing with the gear teeth on said ring, an axial shaft provided on said drive gear and journaled in said frame, a sprocket mounted on said shaft and means coacting with said sprocket to control the rotation of said ring.

8. In a device of the class described, a frame member, a separator ring mounted therein and provided with scalloped pockets on its inner periphery and external gear teeth on its outer periphery, a pair of transparent discs secured one on each side of said ring, one of said discs having graduations thereon adjacent its periphery, an opaque ball disposed between said discs and freely movable therebetween, a pair of transparent plates secured one on each side of said frame, a hub extending transversely through and secured to said discs, a bearing secured to each of said plates, said hub being journaled in said bearings, a drive gear mounted in said frame and meshing with the gear teeth on said ring, a pair of opaque plates secured to said frame to enclose said drive gear, a bearing secured to each of said opaque plates, an axial shaft provided on said drive gear and journaled in said opaque plates, a sprocket mounted on said shaft and means coacting with said sprocket to control the rotation of said ring.

CHARLES D. MASON.